US008508552B2

(12) United States Patent
Lyapunov et al.

(10) Patent No.: US 8,508,552 B2
(45) Date of Patent: Aug. 13, 2013

(54) PIXEL SNAPPING WITH RELATIVE GUIDELINES

(75) Inventors: Mikhail M. Lyapunov, Woodinville, WA (US); Seema L. Ramchandani, Seattle, WA (US); Timothy P. Cahill, Monroe, WA (US)

(73) Assignee: Microsoft Corporation, Redmond, WA (US)

( * ) Notice: Subject to any disclaimer, the term of this patent is extended or adjusted under 35 U.S.C. 154(b) by 1245 days.

(21) Appl. No.: 11/518,073

(22) Filed: Sep. 8, 2006

(65) Prior Publication Data
US 2008/0062206 A1 Mar. 13, 2008

(51) Int. Cl.
*G09G 5/00* (2006.01)

(52) U.S. Cl.
USPC .......................................... 345/677; 345/611

(58) Field of Classification Search
USPC .................................................. 345/677, 611
See application file for complete search history.

(56) References Cited

U.S. PATENT DOCUMENTS

| 5,179,638 A | 1/1993 | Dawson et al. |
| 5,237,647 A | 8/1993 | Roberts et al. |
| 5,261,030 A | 11/1993 | Brooke |
| 5,459,828 A | 10/1995 | Zack et al. |
| 5,519,822 A | 5/1996 | Barkans et al. |
| 5,588,108 A | 12/1996 | Kumar et al. |
| 5,719,595 A | 2/1998 | Hoddie et al. |
| 5,798,752 A | 8/1998 | Buxton et al. |
| 5,838,317 A | 11/1998 | Bolnick et al. |
| 5,872,902 A | 2/1999 | Kuchkuda et al. |
| 5,956,157 A | 9/1999 | Tai |
| 6,101,514 A * | 8/2000 | Chan .............................. 715/232 |
| 6,141,034 A | 10/2000 | McCutchen |
| 6,377,240 B1 | 4/2002 | Baudel et al. |
| 6,377,262 B1 | 4/2002 | Hitchcock et al. |
| 6,600,490 B1 | 7/2003 | Brock et al. |
| 6,636,235 B1 | 10/2003 | Cooper et al. |
| 6,654,020 B2 | 11/2003 | Mori |
| 6,681,053 B1 | 1/2004 | Zhu |
| 6,812,933 B1 | 11/2004 | Silver |
| 6,956,576 B1 | 10/2005 | Deering et al. |
| 7,123,780 B2 | 10/2006 | Carrig |
| 7,287,241 B2 | 10/2007 | Balsiger |
| 7,502,034 B2 | 3/2009 | Chemel et al. |
| 2002/0004755 A1 | 1/2002 | Balthaser |

(Continued)

OTHER PUBLICATIONS

Huang, et al., "FastSplats: Optimized Splatting on Rectilinear Grids", Proceedings Visualization, 2000, 9 pages.

(Continued)

*Primary Examiner* — Maurice L McDowell, Jr.

(57) ABSTRACT

Various technologies and techniques are disclosed for improving output rendering in anti-aliased rendering scenarios. Relative guidelines are used to improve output rendering in certain anti-aliased rendering scenarios. The system receives information regarding at least one visual element area which is important for symmetric appearance, with at least two guideline pairs included in the information. These pairs of relative guidelines represent gaps between edges of elements for which gaps should be preserved. A guideline snapping procedure is performed for each relative guideline to generate a snapping displacement for each relative guideline. The snapping displacements are provided as inputs to a pixel snapping procedure that snaps the points of the visual element to create an adjusted image. The adjusted image is then rendered on a display device in an anti-aliased rendering scenario. Equal sizes of gaps between neighboring elements can be preserved when these gaps are defined equal by a client.

20 Claims, 20 Drawing Sheets

(56) References Cited

U.S. PATENT DOCUMENTS

| | | |
|---|---|---|
| 2003/0160805 A1 | 8/2003 | Toji et al. |
| 2004/0046769 A1 | 3/2004 | Arvin et al. |
| 2004/0056906 A1 | 3/2004 | Arvin |
| 2004/0257619 A1 | 12/2004 | Loce et al. |
| 2004/0261012 A1* | 12/2004 | Balsiger ........................ 715/508 |
| 2005/0088452 A1 | 4/2005 | Hanggie et al. |
| 2005/0218237 A1 | 10/2005 | Lapstun et al. |
| 2005/0275660 A1 | 12/2005 | Keller |
| 2008/0030525 A1 | 2/2008 | Ramchandani et al. |

OTHER PUBLICATIONS

Hasinoff, et al., "Boundary Matting for View Synthesis", Dept. of Computer Science. University of Toronto, Oct. 26, 2005, pp. 1-21.

"Glide 3.0 Reference Manual", Programming the 3Dfx Interactive Glide™ Rasterization Library 3.0, Document Release 020, Jul. 23, 1998, 203 pages.

* cited by examiner

PIXEL SNAPPING APIS
370 public DoubleCollection Visual.XSnappingGuidelines{get; set;} → 372 public DoubleCollection Visual.YSnappingGuidelines{get; set;} → 374

```
Regular pixel snapping:
X0 =   0.000;   X0' =   0;
X1 =  36.661;   X1' =  37;
X2 =  37.795;   X2' =  38;
X3 =  74.457;   X3' =  74;
X4 =  75.591;   X4' =  76;
X5 = 112.252;   X5' = 112;

Pixel snapping with relative guidelines:
X0 =   0.000;   X0' =   0;   D0' =  0.000;   D0" =  0;   X0" =   0;
X1 =  37.795;   X1' =  38;   D1' = -1.134;   D1" = -1;   X1" =  37;
X2 =  37.795;   X2' =  38;   D2' =  0.000;   D2" =  0;   X2" =  38;
X3 =  75.591;   X3' =  76;   D3' = -1.134;   D3" = -1;   X3" =  75;  <--- fixed
X4 =  75.591;   X4' =  76;   D4' =  0.000;   D4" =  0;   X4" =  76;
X5 = 113.386;   X5' = 113;   D5' = -1.134;   D5" = -1;   X5" = 112;
```

FIG. 21

PIXEL SNAPPING WITH RELATIVE GUIDELINES

CROSS-REFERENCE TO RELATED APPLICATIONS

This is a continuation-in-part application of application Ser. No. 11/497,170, filed Aug. 1, 2006, entitled "Pixel Snapping for Anti-Aliased Rendering", the specification of which is incorporated by reference herein in its entirety.

BACKGROUND

Anti-aliasing is a technique that is used to make graphics and text easier to read and pleasing to the eye when viewed on a computer screen. Anti-aliasing is a way of getting around the low dots per inch (DPI) resolution of the computer screen (such as 72 DPI). Anti-aliased rendering affects pixels on the edges of a rendered figure. It calculates the percentage of pixel area covered by the figure and composes a color value as a mixture of figure color and background color. Anti-aliasing cannot improve the physical resolution of a display (e.g. an anti-aliased image on 72 DPI display will never be as crisp as on 1200 DPI), but anti-aliasing minimizes the difference between ideal and generated images and thus improves quality. In particular, anti-aliasing suppresses so-called "saw teeth" edges that used to appear on tilted figure edges without anti-aliasing.

One problem with anti-aliasing, however, is that it can produce irregular soft and sharp rendering of an image on the screen, depending on the location of edges. For example, an edge that falls exactly between screen pixels appears sharp, but an edge that falls in the middle of a screen pixel appears soft. This problem is implicitly created by device independent layout calculations. When device resolution is known, layout calculations can place edges exactly onto the boundaries between pixel rows and columns. Device independency assumes the resolution is not known so edges will either coincide with the pixel grid or take some fraction of a pixel row. For example, a vertical black line that is one pixel wide can appear as a column of black pixels while another similar line can appear as two columns of grey pixels, due to half pixel offset.

An additional problem that can occur when using anti-aliasing is seeping. Seeping occurs when two abutting objects have a common edge that is not aligned between a row or column of device pixels. The first rendered object fills the pixels on the edge with a mixture of background and foreground color. The second object will take these pixels as its background and in turn mix it with a second foreground color so that the initial background penetrates into the resulting color values. Seeping is especially unpleasant when objects have the same solid foreground color and are supposed to appear as a single shape, while anti-aliased rendering leaves undesired seams that remain visible even on high DPI devices.

SUMMARY

Various technologies and techniques are disclosed for improving output rendering in anti-aliased rendering scenarios. The system receives information regarding at least one visual element area which is important for symmetric appearance. The information can include at least one guideline that a client would like to be snapped towards on a pixel grid. The system uses the information to perform a pixel snapping procedure to snap the points of visual element to a pixel grid to create an adjusted image. The adjusted point coordinates are then used for rendering the visual element on a display device in an anti-aliased rendering scenario.

APIs are provided for setting horizontal and vertical pixel snapping guidelines. The collections containing the snapping guidelines are accessed and used during the pixel snapping procedure. The guidelines are used to calculate guideline snapping displacements that are used as translation values for visual element points. In one implementation, the pixel snapping procedure improves a rendering appearance of the outputted image.

In one implementation, relative guidelines are used to improve output rendering in certain anti-aliased rendering scenarios. The system receives information regarding at least one visual element area which is important for symmetric appearance, with at least two guideline pairs included in the information. These guideline pairs represent edges of elements for which gaps should be preserved. In one implementation, each relative guideline comprises a leading coordinate and an offset; each guideline pair comprises two relative guidelines that have the same leading coordinate. A guideline snapping procedure is performed for each relative guideline to generate a displacement value that should be applied to each relative guideline in order to snap it onto the pixel grid. The displacements are provided as inputs to a pixel snapping procedure that shifts the points of the visual element to create an adjusted image. The adjusted image is then rendered on a display device in an anti-aliased rendering scenario.

In another implementation, a pixel snapping mode of operation is turned on and off to improve output rendering in certain anti-aliased rendering scenarios. For example, when the system detects that an animation has started, the pixel snapping mode of operation is turned off, and when the system detects that the animation has stopped, the pixel snapping mode of operation is resumed. One or more techniques for providing a smooth transition can be used when turning the pixel snapping mode of operation on. One example of a transition technique includes turning off the pixel snapping mode of operation because an animation is beginning by lowering a strength of an effect of the pixel snapping mode of operation immediately to zero. An example of a smoothing technique includes turning on the pixel snapping mode of operation because the animation is finished by raising the strength of the effect of the pixel snapping mode of operation over a period of time until the strength is full strength.

In yet other implementations, one or more combinations of these techniques are used to improve output rendering in certain anti-aliased rendering or other scenarios.

This Summary was provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 10 is a class diagram for one implementation of the system of FIG. 1 that illustrates two pixel snapping APIs.

FIG. 19 is a logical diagram further illustrating six relative guidelines that could be used to preserve the gaps between the three hypothetical buttons.

FIG. 20 is a logical diagram illustrating how the relative guidelines of FIG. 19 are translated into leading coordinates and an offset coordinates.

FIG. 21 is a logical diagram illustrating how the values of FIG. 20 would be translated by the system upon applying the guideline snapping procedure described in FIG. 14.

DETAILED DESCRIPTION

Figure 1:
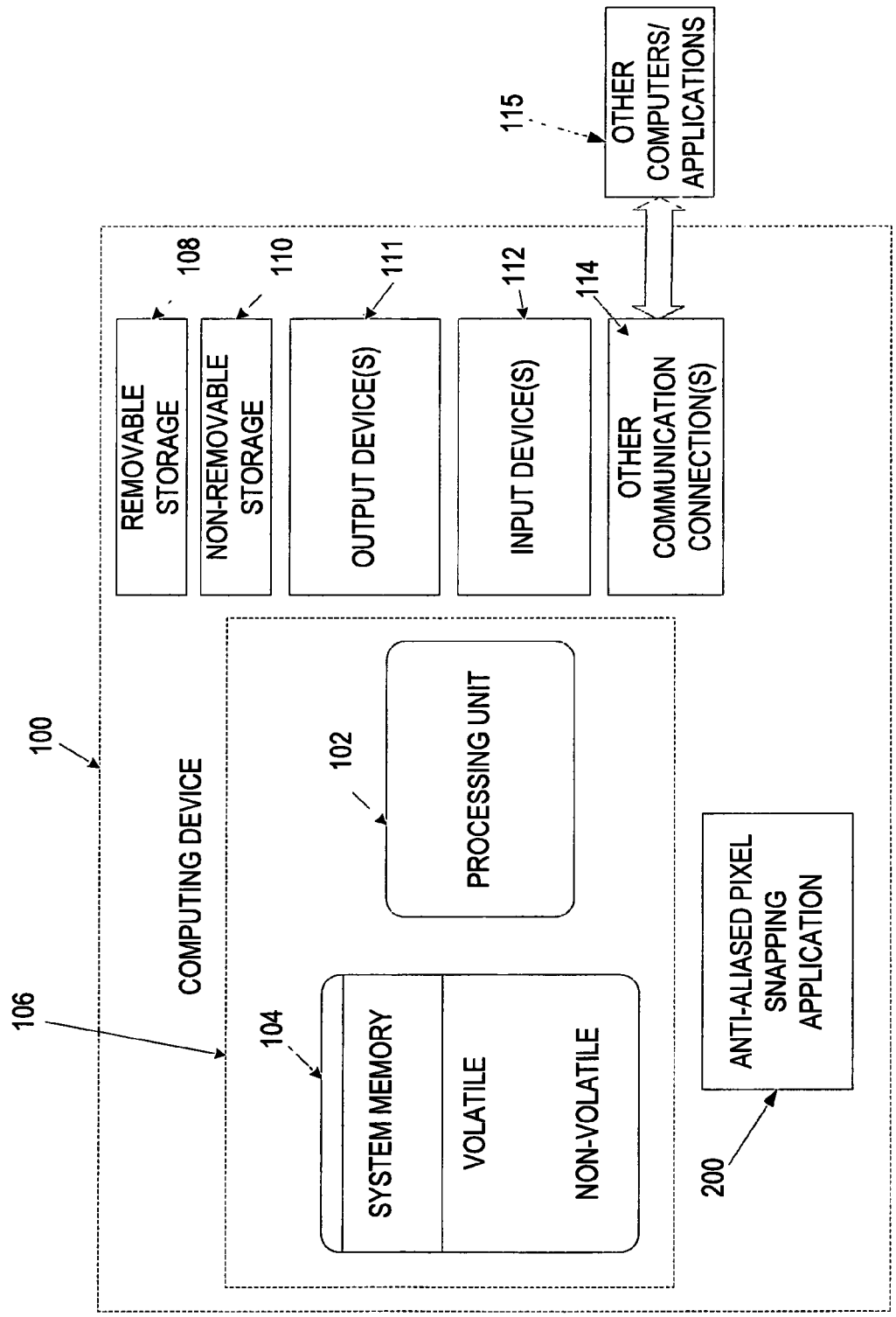
FIG. 1 is a diagrammatic view of a computer system of one implementation.

For the purposes of promoting an understanding of the principles of the invention, reference will now be made to the embodiments illustrated in the drawings and specific language will be used to describe the same. It will nevertheless be understood that no limitation of the scope is thereby intended. Any alterations and further modifications in the described embodiments, and any further applications of the principles as described herein are contemplated as would normally occur to one skilled in the art.

The system may be described in the general context as a pixel snapping application for anti-aliased rendering situations, but the system also serves other purposes in addition to these. In one implementation, one or more of the techniques described herein can be implemented as features within an operating system program such as MICROSOFT® WINDOWS®, or from any other type of program or service that is responsible for analyzing and/or outputting graphical elements for display on a display device. In another implementation, one or more of the techniques described herein are implemented as features with other applications that deal with improving the rendering of output to a display device for viewing by a user.

In one implementation, one or more of the problems mentioned in the Background Section have been solved by one or more of the techniques first described in the parent case patent filed earlier: "Pixel Snapping for Anti-Aliased Rendering". Pixel snapping applies small displacements to the edges of visual elements that are critical for visual element appearance. Pixel snapping is controlled with so-called guidelines. The term "guideline" as used herein refers to a user-defined line utilized as a guide by which the system uses to position the visual element for the purpose of having the edges coincide with device pixels. The rendering system, that works with a device of particular resolution, converts the coordinates of guidelines into device space measured in pixels. The rendering system then detects the displacement that should be applied to the guideline in order to make it to coincide with the nearest boundary between pixel rows or columns. This calculation is referred to as a guideline snapping procedure. Finally, the rendering system applies this offset to surrounding area of visual element, so far placing critical edges onto the pixel grid.

In one implementation, pixel snapping, as described above, provides symmetric appearance of each visual, but does not provide a good positioning of visuals relative to one another. The edges of a neighboring visual might happen to be displaced to right or to left (up or down for horizontal guidelines), depending on which pixel row or column happened to be closer to the guideline. Therefore, the gaps between neighboring visuals that were defined equal by the user turn out to not be equal on the screen. This distortion is especially noticeable when the gaps are small and when the scene has regular rows (columns, tables) of similar visual elements.

Sometimes, problems can appear on animated scenarios when a number of visual elements are required to move across the screen. Device independency and anti-aliasing allow arbitrary speed of animation, including very slow animations when coordinates change from frame to frame by small fraction of pixel. Pixel snapping quantizes this process: each visual stays immoveable during several frames, then jumps to next pixel position. Quantizing itself does not create a problem. The matter is that different visual elements jump at different moments of time, so that the distances between neighboring elements change from frame to frame. Moreover, different edges of single visual (controlled by different guidelines) use to jump at different moments, thus virtually changing the size of the visual. Such behavior is perceived as unpleasant wriggling of the edges of a single visual. One or more of the implementations discussed herein can solve these issues, fewer issues, and/or additional issues.

As shown in FIG. 1, an exemplary computer system to use for implementing one or more parts of the system includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106.

Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Computing device 100 includes one or more communication connections 114 that allow computing device 100 to communicate with other computers/applications 115. Device 100 may also have input device(s) 112 such as keyboard, mouse, pen, voice input device, touch input device, etc. Output device(s) 111 such as a display device, speakers, printer, etc. may also be included. These devices are well known in the art and need not be discussed at length here. In one implementation, computing device 100 includes anti-aliased pixel snapping application 200, which will be described in further detail in FIG. 2.

Figure 2:
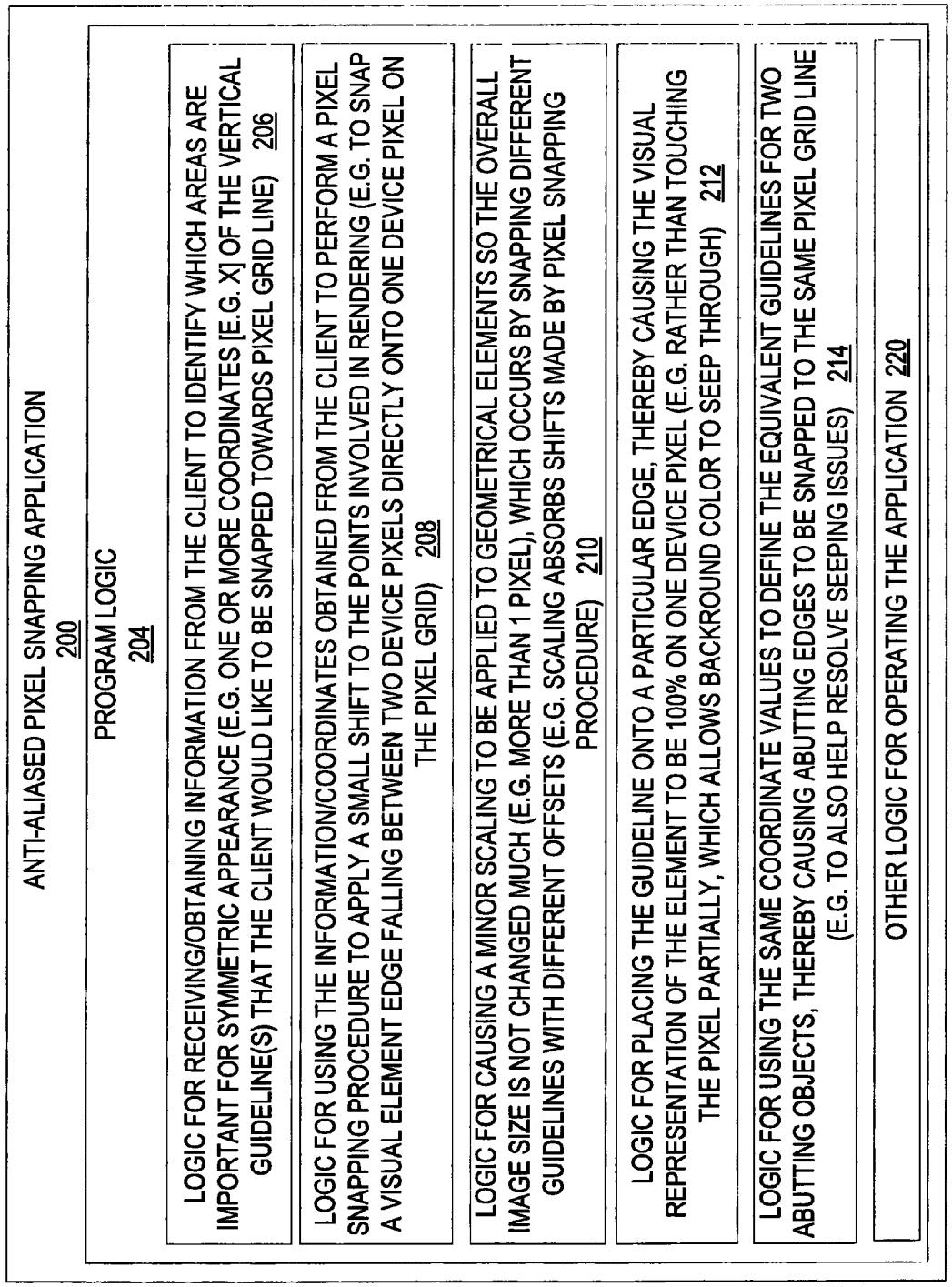
FIG. 2 is a diagrammatic view of an anti-aliased pixel snapping application of one implementation operating on the computer system of FIG. 1.

Turning now to FIG. 2 with continued reference to FIG. 1, an anti-aliased pixel snapping application 200 operating on computing device 100 is illustrated. Anti-aliased pixel snapping application 200 is one of the application programs that reside on computing device 100. Alternatively or additionally, one or more parts of anti-aliased pixel snapping application 200 can be part of system memory 104, on other computers and/or applications 115, or other such variations as would occur to one in the computer software art.

Anti-aliased pixel snapping application 200 includes program logic 204, which is responsible for carrying out some or all of the techniques described herein. Program logic 204 includes logic for receiving/obtaining information from the client to identify which areas are important for symmetric appearance (e.g. one or more coordinates [e.g. X] of the vertical guideline(s) that the client would like to be snapped towards the pixel grid line) 206; logic for using the information/coordinates obtained from the client to perform a pixel snapping procedure to apply a small shift to the points involved into rendering procedure (e.g. snap an edge of a visual element falling between two device pixels directly onto one device pixel on the pixel grid) 208; logic for causing a minor scaling to be applied to geometrical elements so the overall image size is not changed much (e.g. more than 1 pixel), which occurs by snapping different guidelines with different offsets (e.g. scaling absorbs shifts made by pixel snapping procedure). 210; logic for placing the guideline onto a particular edge, thereby causing the visual representation of the element to be 100% on one device pixel (e.g. rather than touching that pixel partially, which allows background color to seep through) 212; logic for using the same coordinate values to define equivalent guidelines for two abutting objects, thereby causing abutting edges to be snapped to the same pixel grid line (e.g. to also help resolve seeping issues) 214; and other logic for operating the application 220. In one implementation, program logic 204 is operable to be called programmatically from another program, such as using a single call to a procedure in program logic 204.

Figure 3:
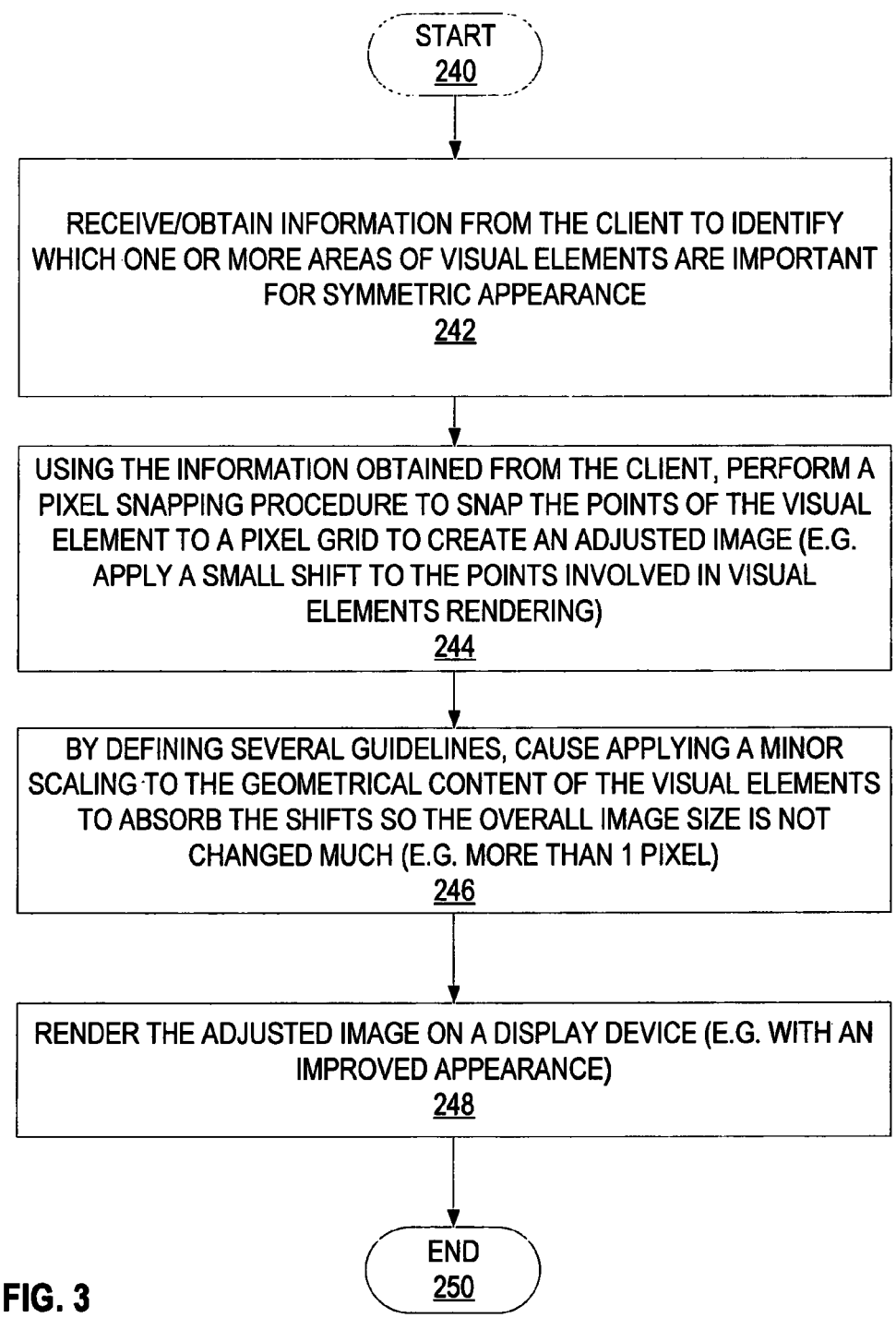
FIG. 3 is a high-level process flow diagram for one implementation of the system of FIG. 1.

Turning now to FIGS. 3-6 with continued reference to FIGS. 1-2, the stages for implementing one or more implementations of anti-aliased pixel snapping application 200 are described in further detail. FIG. 3 is a high level process flow diagram for one implementation of anti-aliased pixel snapping application 200. In one form, the procedure of FIG. 3 is at least partially implemented in the operating logic of computing device 100.

The procedure begins at start point 240 with receiving/obtaining information from the client to identify the visual elements (e.g. which one or more areas are important for symmetric appearance) and the horizontal/vertical guidelines; the guidelines are used to align the elements in the appropriate (horizontal or vertical) orientation (stage 242). As mentioned previously, the term guideline as used herein refers to a user-defined line utilized as a guide by which the system uses to position the visual element for the purpose of having the edges coincide with device pixels.

Using the information obtained from the client, the system performs a pixel snapping procedure to snap the points of the visual element to a pixel grid to create an adjusted image (e.g. to apply a small shift to the points involved in visual elements rendering) (stage 244). By defining several guidelines, cause a minor scaling to the geometrical content of the visual elements to absorb the shifts so the overall image size is not changed much (e.g. more than one pixel) (stage 246). The adjusted image is rendered on a display device (e.g. with an improved appearance as a result of the pixel snapping) (stage 248). The procedure ends at point 250.

Figure 4:
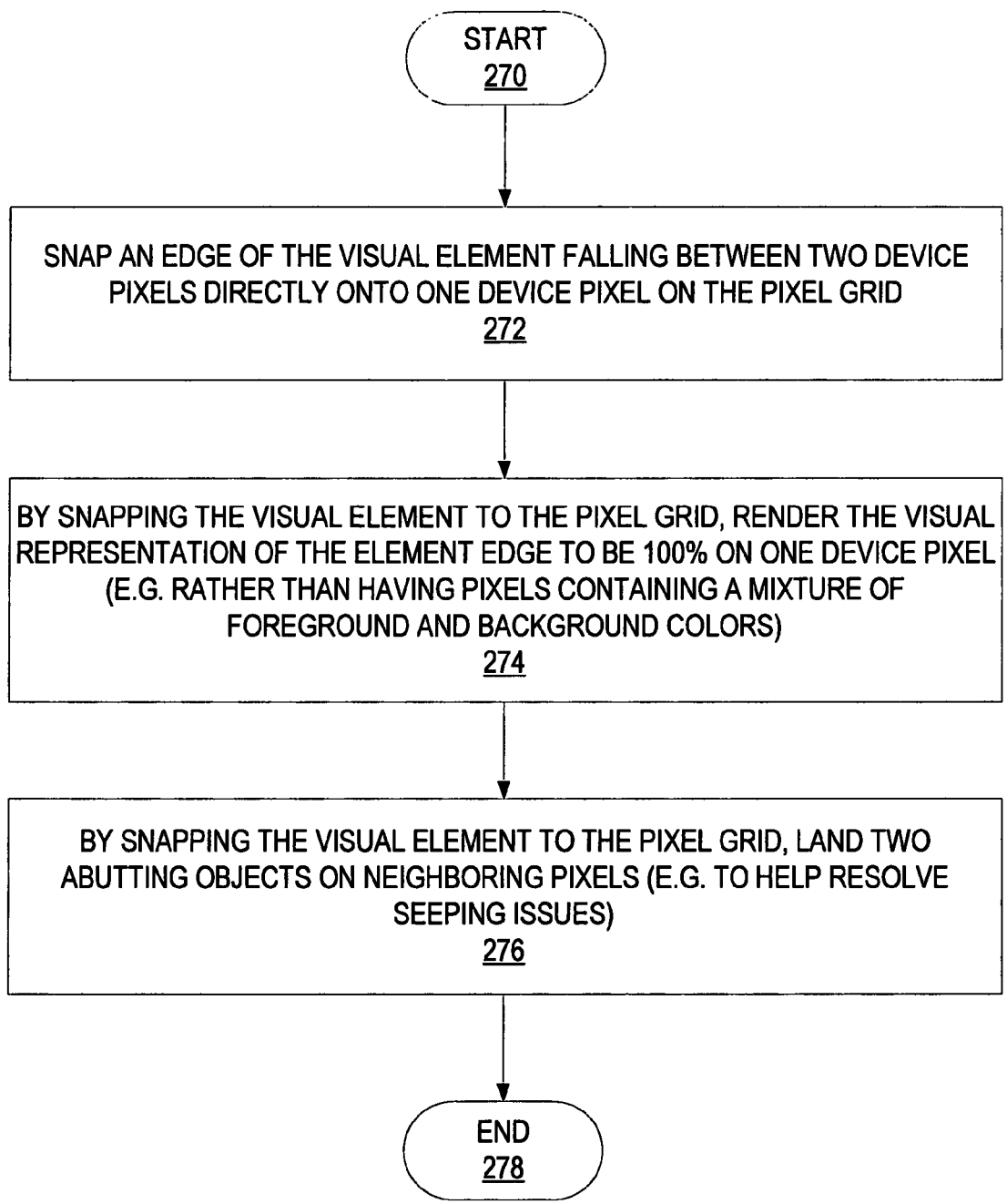
FIG. 4 is a process flow diagram for one implementation of the system of FIG. 1 illustrating the high level stages involved in snapping a visual element to a pixel grid.

Turning now to FIG. 4, a process flow diagram for one implementation of the system of FIG. 1 illustrating the high level stages involved in snapping a visual element to a pixel grid is shown. In one form, the procedure of FIG. 4 is at least partially implemented in the operating logic of computing device 100. The procedure begins at start point 270 with snapping a horizontal or vertical edge of the visual element falling between two device pixels directly onto one device pixel on the pixel grid (stage 272). By snapping the edge of the visual element to the pixel grid, the system renders the edge of the visual representation of the element to be 100% on one device pixel (e.g. rather than having pixels containing a mixture of foreground and background colors) (stage 274). Alternatively or additionally, by snapping the horizontal and vertical edges of the visual element to the pixel grid, two abutting objects are landed on neighboring pixels (e.g. to help resolve seeping issues) (stage 276). The procedure ends at end point 278.

Figure 5:
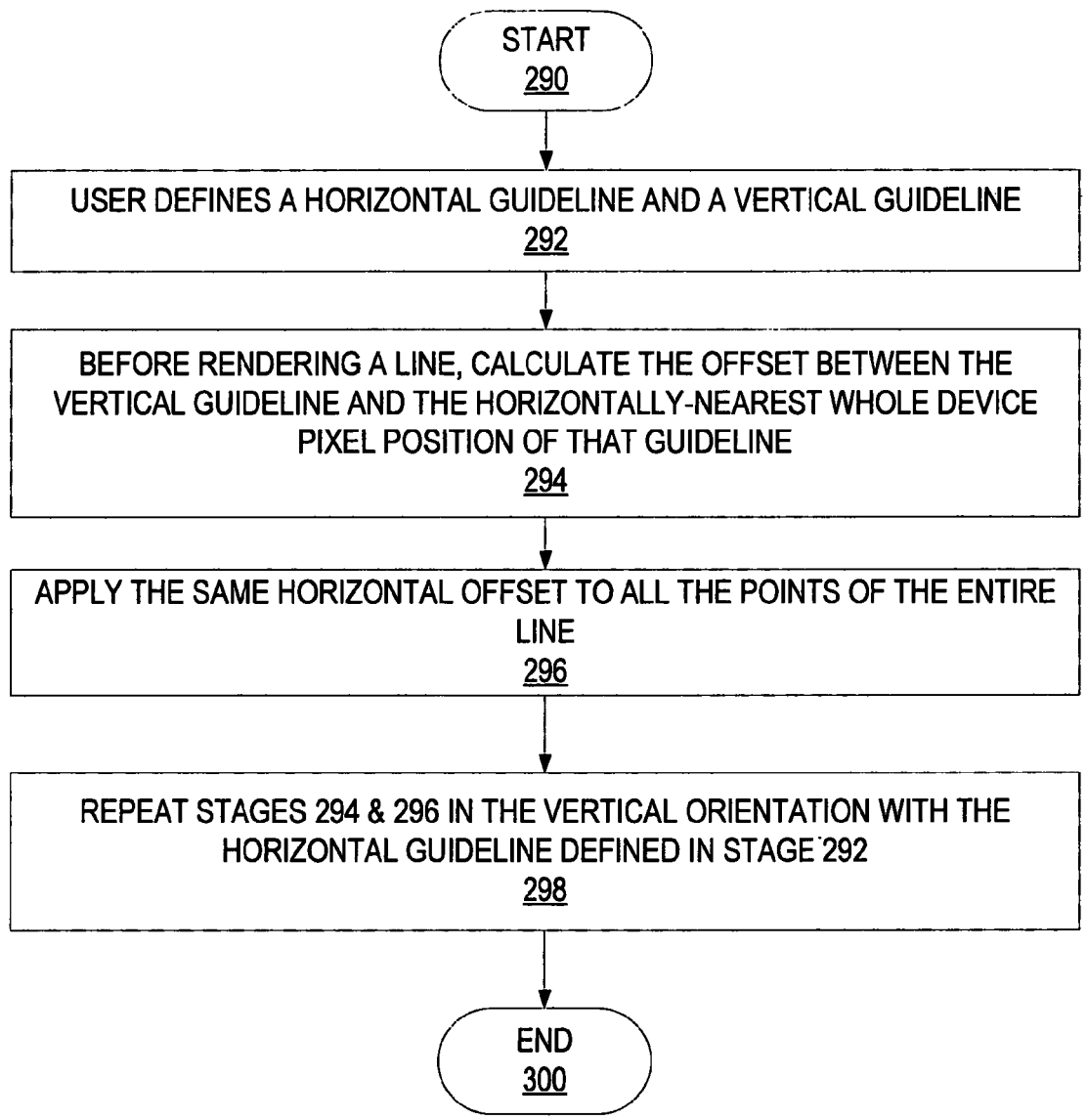
FIG. 5 is a process flow diagram for one implementation of the system of FIG. 1 illustrating the more detailed stages involved in snapping a horizontal visual line to a pixel grid.

FIG. 5 is a process flow diagram for one implementation of the system of FIG. 1 illustrating the more detailed stages involved in snapping a visual element to a pixel grid. In one form, the procedure of FIG. 5 is at least partially implemented in the operating logic of computing device 100. The procedure begins at start point 290 with the user defining a horizontal guideline and a vertical guideline (stage 292). Before rendering a line, the system calculates the offset between the vertical guideline and the horizontally-nearest whole pixel position of that guideline (stage 294). The same horizontal offset is applied to all points of the entire line (stage 296). The system repeats stages 294 and 296 in the vertical orientation with the horizontal guideline (stage 298). In one implementation, the points between two snapping guidelines are adjusted in proportion to the adjustment made to points on the guidelines, so that straight diagonal lines between snapping gridlines remain straight. The procedure then ends at end point 300.

Figure 6:
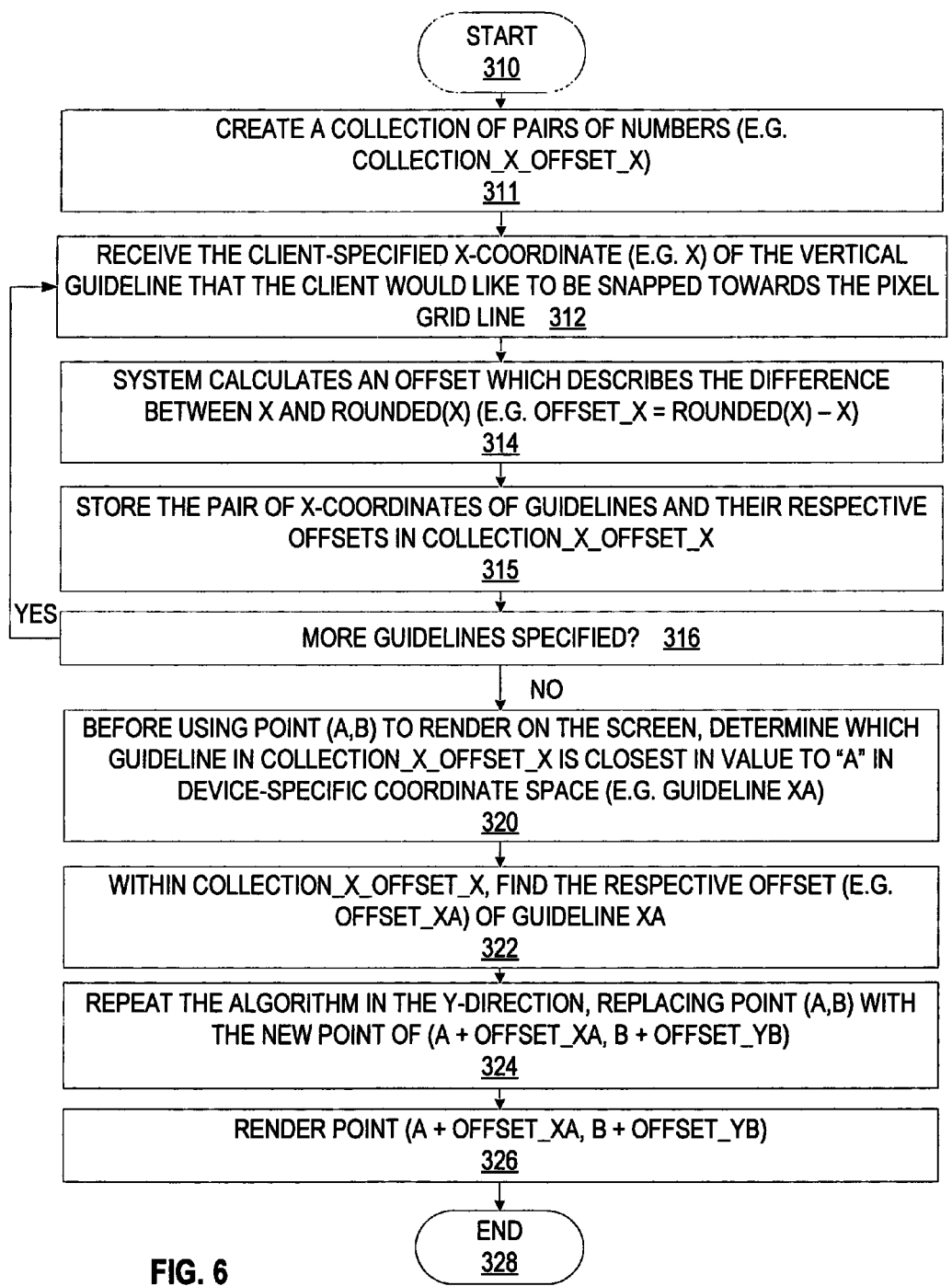
FIG. 6 is a process flow diagram for one implementation of the system of FIG. 1 illustrating the stages involved in using guidelines and offsets in a pixel snapping procedure to snap a visual element to a pixel grid.

FIG. 6 is a process flow diagram for one implementation of the system of FIG. 1 illustrating the stages involved in using guidelines and offsets in a pixel snapping procedure to snap a visual element to a pixel grid. In one form, the procedure of FIG. 6 is at least partially implemented in the operating logic of computing device 100. The procedure starts at start point 310 with creating a collection of pairs of numbers (e.g. Collection_X_Offset_X) (stage 311). The system receives the client-specified X-coordinate (e.g. X) of the vertical guideline that the client would like to be snapped towards pixel grid line (stage 312). The system calculates an offset which describes the difference between X and Rounded(X) (e.g. Offset_X=Rounded(X)−X) (stage 314). The system stores the pair of X-coordinates of guidelines and their respective offsets in Collection_X_Offset_X (stage 315). If more guidelines are specified (decision point 316), then stages 310 and 312 are repeated. Before using the point (A,B) in rendering, the system determines which guideline in Collection_X_Offset_X is closest in value to "A" in device-specific coordinate space (e.g. Guideline XA) (stage 320). Within Collection_X_Offset_X, the system finds the respective offset (e.g. Offset_XA) of guideline XA (stage 322). The algorithm is repeated in the Y-direction (e.g. stages 320 and 322), replacing point (A,B) with the new point of (A+Offset_XA, B+Offset_YB) (stage 324). The system renders the point (A+Offset_XA, B+Offset_YB) on a display device (stage 326). The procedure ends at end point 328.

Figure 7:
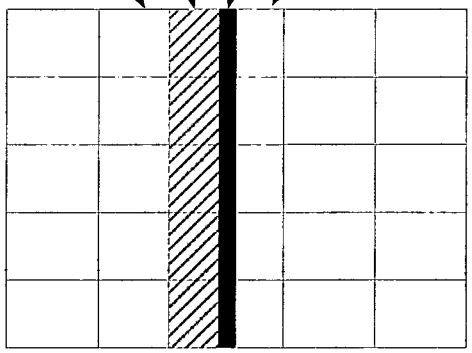
FIG. 7 is a geometrical diagram for one implementation of the system of FIG. 1 that illustrates applying a guideline to a pixel grid.
Figure 8:
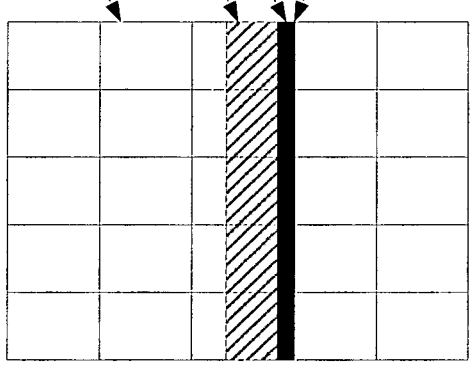
FIG. 8 is a geometrical diagram for one implementation of the system of FIG. 1 that illustrates snapping the guideline and line to the nearest whole pixel.
Figure 9:
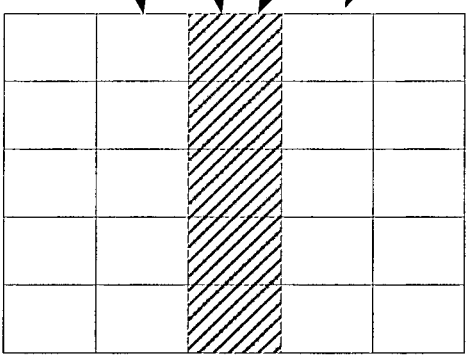
FIG. 9 is a geometrical diagram for one implementation of the system of FIG. 1 that illustrates rendering the adjusted line after performing the pixel snapping procedure.

Turning now to FIGS. 7-9, geometrical diagrams will be shown to graphically illustrate the pixel snapping procedure described in FIGS. 3-6. The same reference numerals will be used to represent the same elements on FIGS. 7-9. FIG. 7 is a geometrical diagram for one implementation of the system of FIG. 1 that illustrates applying a guideline 350 to a pixel grid. Guideline 350 is displayed adjacent to the line 352 which is to be rendered on the display device. Line 352 is currently located between two different device pixels (354 and 356, respectively).

FIG. 8 is a geometrical diagram for one implementation of the system of FIG. 1 that illustrates snapping the guideline 350 and line 352 to the nearest whole pixel 356 using the pixel snapping procedure described in FIGS. 3-6. After snapping guideline 350 to pixel 356, guideline 350 and line 352 no longer cross over pixel 354. FIG. 9 illustrates one implementation of rendering the adjusted line after performing the pixel snapping procedure. Line 352 now spans the entire pixel 356, and is located evenly between pixels 354 and 358.

FIG. 10 is a class diagram for one implementation of the system of FIG. 1 that illustrates pixel snapping APIs 370. An API called XSnappingGuidelines 372 and an API called YSnappingGuidelines 374 are shown. These APIs allow for setting a collection of horizontal pixel snapping guidelines on a visual in anti-aliased rendering scenarios. In one implementation, setting a new X or Y guidelines collection replaces any existing collection. The collection may be cleared by setting an empty collection. In another implementation, the collection of guidelines applies to a single visual. Guidelines are inherited by lower level visuals in the tree. In the case that a lower level defines its own guideline set, the parent's guideline set is ignored. The operation of these APIs is described in further detail in FIG. 11.

Figure 11:
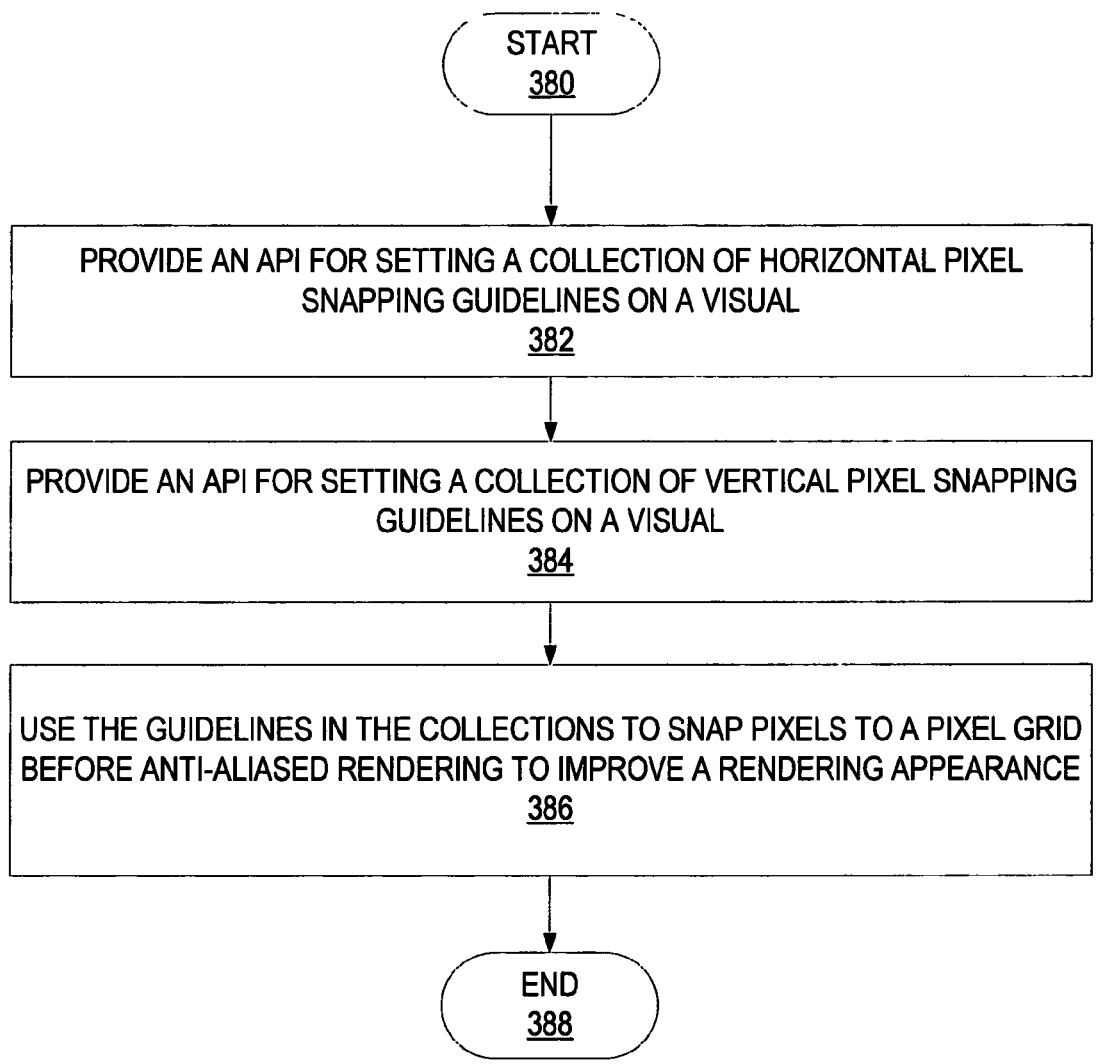
FIG. 11 is a process flow diagram for one implementation of the system of FIG. 1 illustrating the stages involved in using the pixel snapping APIs of FIG. 10 to snap pixels to a pixel grid before anti-aliased rendering.

In FIG. 11, a process flow diagram is shown for one implementation illustrating the stages involved in using the pixel snapping APIs of FIG. 10 to snap pixels to a pixel grid before anti-aliased rendering. In one form, the procedure of FIG. 11 is at least partially implemented in the operating logic of computing device 100. The procedure starts at start point 380 with providing an API for setting a collection of horizontal pixel snapping guidelines on a visual (stage 382). An API is provided for setting a collection of vertical pixel snapping guidelines on a visual (stage 384). The system uses the guidelines in the collections to snap pixels to a pixel grid before anti-aliased rendering to improve a rendering appearance (stage 386). The procedure ends at end point 388.

Figure 12:
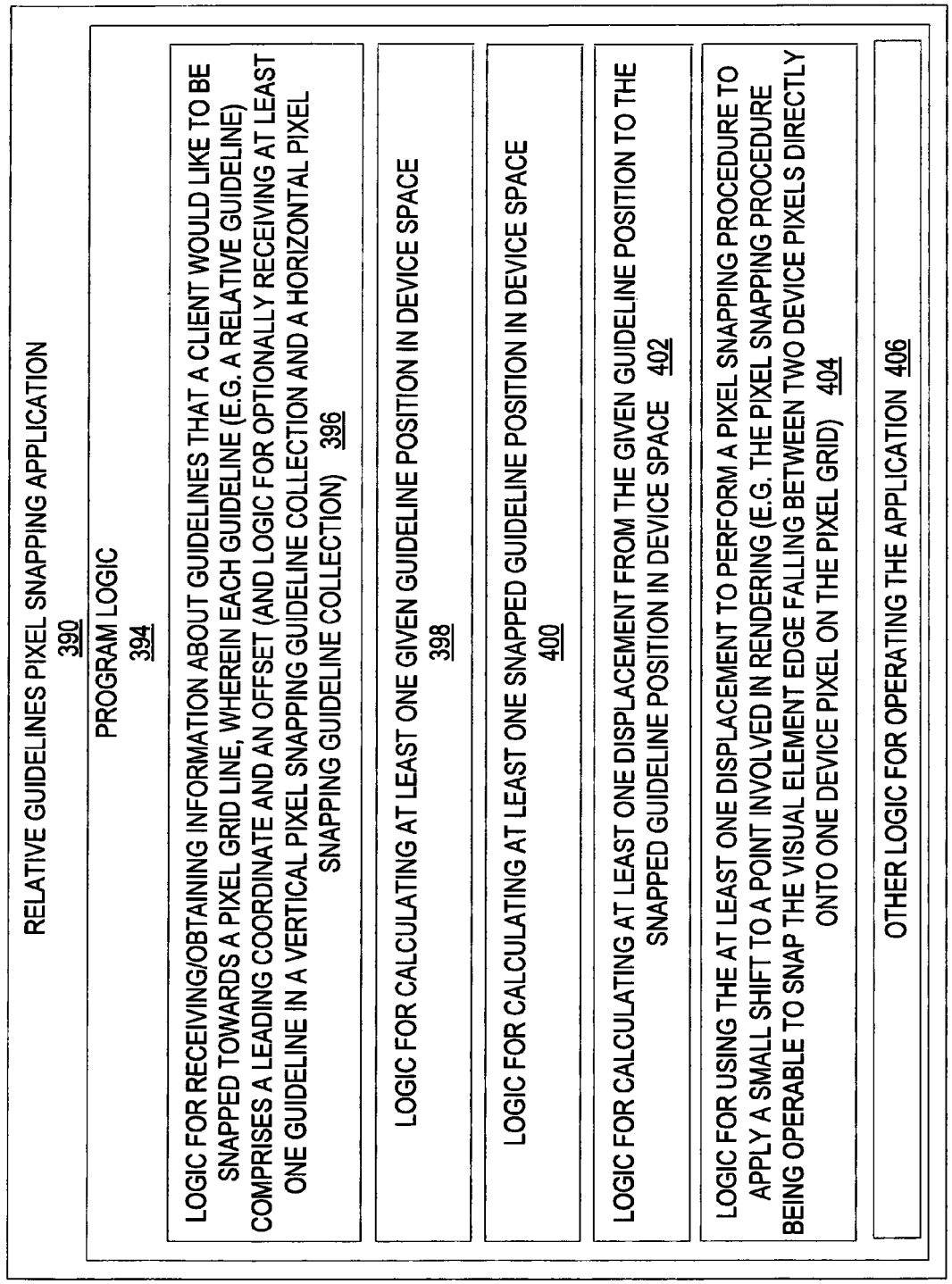
FIG. 12 is a diagrammatic view of a relative guidelines pixel snapping application of one implementation operating on the computer system of FIG. 1.

FIG. 12 illustrates one implementation of a relative guidelines pixel snapping application 390. In one implementation, program logic 394 for relative guidelines pixel snapping application 390 is included as a part of the program logic 204 in anti-aliased pixel snapping application 200. Program logic 394 includes logic for receiving/obtaining information about guidelines that a client would like to be snapped towards a pixel grid line, wherein each guideline (e.g. a relative guideline) comprises a leading coordinate and an offset (and logic for optionally receiving at least one guideline in a vertical pixel snapping guideline collection and a horizontal pixel snapping guideline collection) 396; logic for calculating at least one given guideline position in device space 398; logic for calculating at least one snapped guideline position in device space 400; logic for calculating at least one displacement from the given guideline position to the snapped guideline position in device space 402; logic for using the at least one displacement to perform a pixel snapping procedure to apply a small shift to a point involved in rendering (e.g. the pixel snapping procedure being operable to snap the visual element edge falling between two device pixels directly onto one device pixel on the pixel grid) 404; and other logic for operating the application 406.

Figure 13:
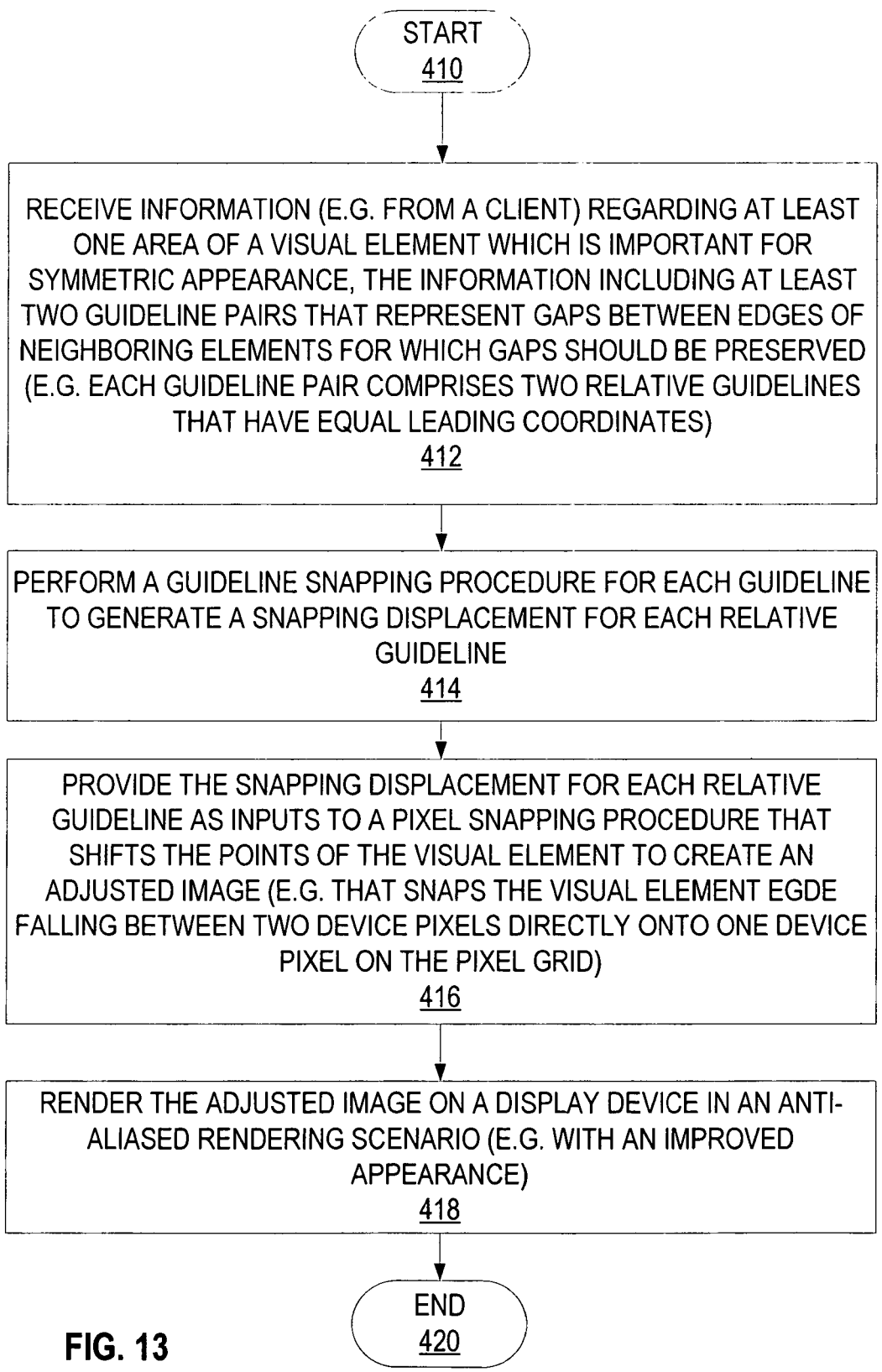
FIG. 13 is a process flow diagram for one implementation of the system of FIG. 12 illustrating the stages involved in performing a pixel snapping procedure using relative guidelines.

FIG. 13 illustrates one implementation of the stages involved in performing a pixel snapping procedure using relative guidelines. In one form, the process of FIG. 13 is at least partially implemented in the operating logic of computing device 100. The procedure begins at start point 410 with receiving information (e.g. from a client) regarding at least one area of a visual element which is important for symmetric appearance, the information including at least two guideline pairs that represent gaps between edges of neighboring elements for which gaps should be preserved (stage 412). In one implementation, each guideline pair comprises two relative guidelines that have equal leading coordinates (stage 412). A guideline snapping procedure is performed for each relative guideline to generate a snapping displacement for each guideline (stage 414). The snapping displacements for each relative guideline are provided as inputs to a pixel snapping procedure that shifts the points of the visual element to create an adjusted image (stage 416). In one implementation, the visual element edge falling between two device pixels is snapped directly onto one device pixel on the pixel grid (stage 416). The adjusted image is rendered on a display device in an anti-aliased rendering scenario (e.g. with an improved appearance) (stage 418). The process ends at end point 420.

Figure 14:
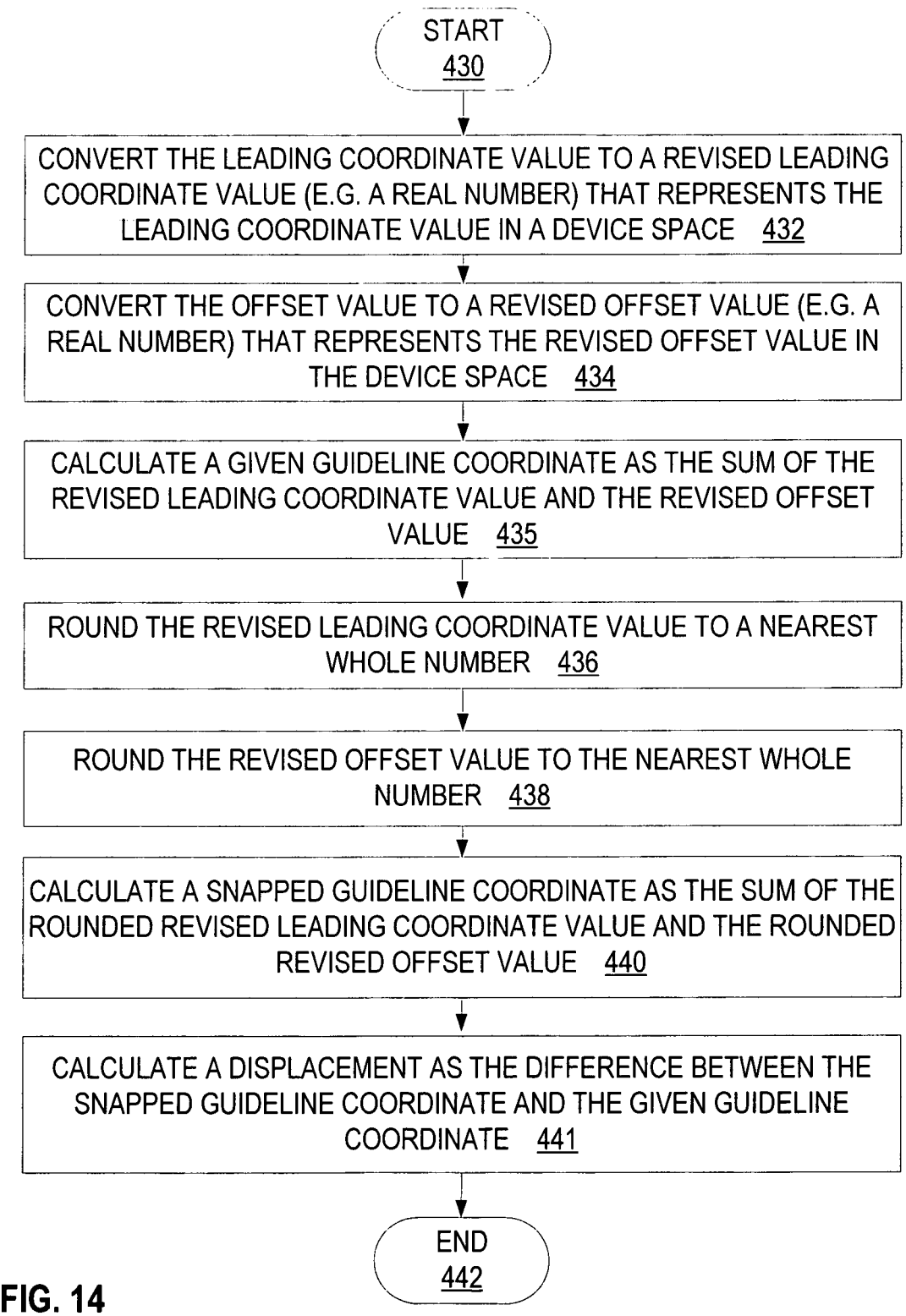
FIG. 14 is a process flow diagram for one implementation of the system of FIG. 12 illustrating the stages involved in performing the guideline snapping procedure.

FIG. 14 illustrates one implementation of the stages involved performing the guideline snapping procedure. In one form, the process of FIG. 14 is at least partially implemented in the operating logic of computing device 100. The procedure begins at start point 430 with converting the leading coordinate value to a revised leading coordinate value (e.g. a real number) that represents the leading coordinate value in a device space (stage 432). The offset value is converted to a revised offset value (e.g. a real number) that represents the revised offset value in the device space (stage 434). The given guideline coordinate is calculated as the sum of the revised leading coordinate value and the revised offset value (stage 435). The revised leading coordinate value is rounded to a nearest whole number (stage 436). The revised offset value is rounded to the nearest whole number (stage 438). The snapped guideline coordinate is calculated as the sum of the rounded revised leading coordinate value and the rounded revised offset value (stage 440). The snapping displacement is calculated as the difference between the snapped guideline coordinate and the given guideline coordinate (stage 441). The process ends at end point 442.

Figure 15:
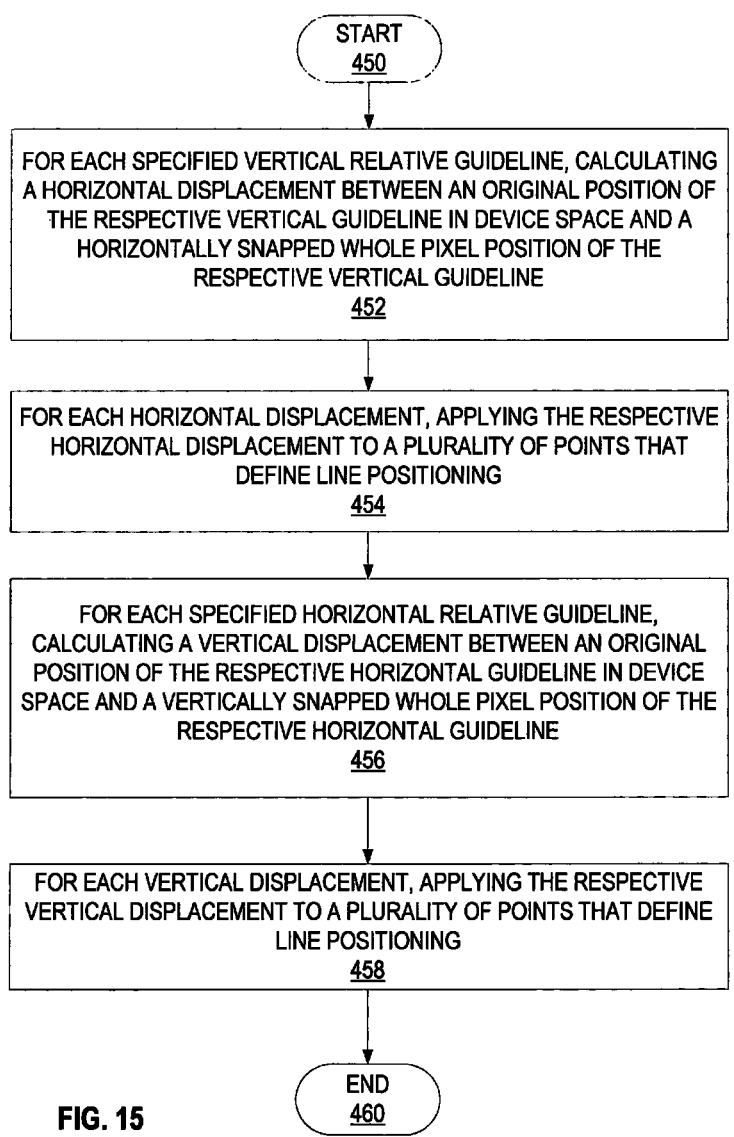
FIG. 15 is a process flow diagram for one implementation of the system of FIG. 12 illustrating the stages involved in performing a pixel snapping procedure after the guideline snapping procedure has been executed.

FIG. 15 illustrates one implementation of the stages involved in performing a pixel snapping procedure after the guideline snapping procedure has been executed. In one form, the process of FIG. 15 is at least partially implemented in the operating logic of computing device 100. The procedure begins at start point 450 with calculating for each specified vertical relative guideline a horizontal displacement between an original position of the respective vertical guideline in device space and a horizontally snapped whole pixel position of the respective vertical guideline (stage 452). For each horizontal displacement, the respective horizontal displacement is applied to a plurality of points that define line positioning (stage 454). For each specified horizontal relative guideline, a vertical displacement is calculated between an original position of the respective horizontal guideline in the device space and a vertically snapped whole pixel position of the respective horizontal guideline (stage 456). For each vertical displacement, the respective vertical displacement is applied to a plurality of points that define line positioning (stage 458). The process ends at end point 460.

Figure 16:
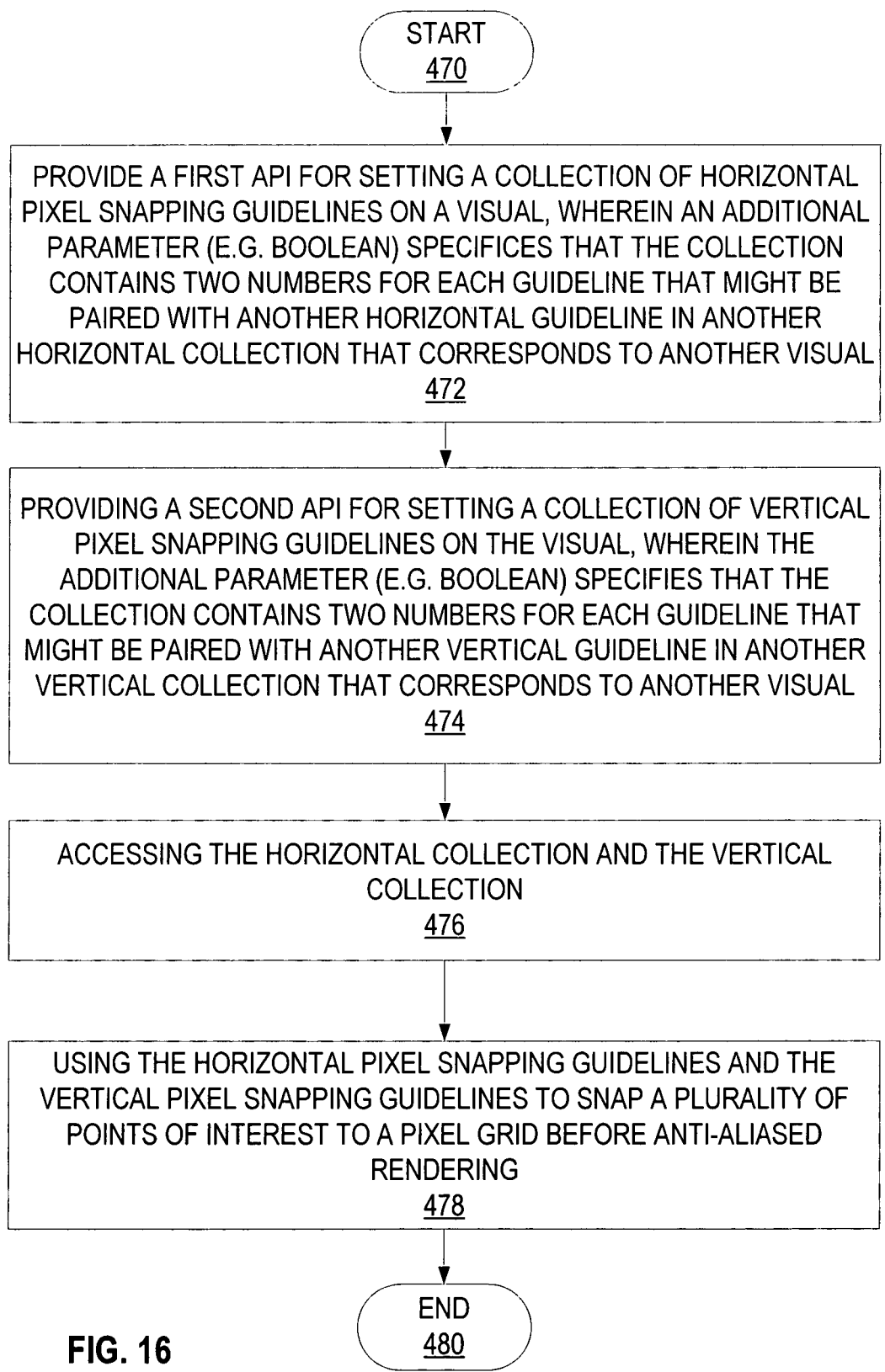
FIG. 16 is a process flow diagram for one implementation of the system of FIG. 12 illustrating the stages involved in using the pixel snapping APIs of FIG. 15 to allow client to supply guidelines data

FIG. 16 is a process flow diagram for one implementation of the system of FIG. 12 illustrating the stages involved in using the pixel snapping techniques of FIG. 15 to allow a client to supply guidelines data. In one form, the process of FIG. 16 is at least partially implemented in the operating logic of computing device 100. The procedure begins at start point 470 with providing a first API for setting a collection of horizontal pixel snapping guidelines on a visual, wherein an additional parameter (such as a Boolean) specifies that the horizontal collection contains two numbers for each guideline that might be paired with another horizontal guideline in another horizontal collection the corresponds to another visual (stage 472). A second API is provided for setting a collection of vertical pixel snapping guidelines on the visual, wherein an additional parameter (such as a Boolean) specifies that the vertical collection contains two numbers for each vertical guideline that might be paired with another vertical guideline in another vertical collection that corresponds to another visual (stage 474). The horizontal and vertical collections are accessed (stage 476). Using the horizontal pixel snapping guidelines and the vertical snapping guidelines, a plurality of points of interest are snapped to a pixel grid before anti-aliased rendering (stage 478). The procedure then ends at end point 480.

Figure 17:
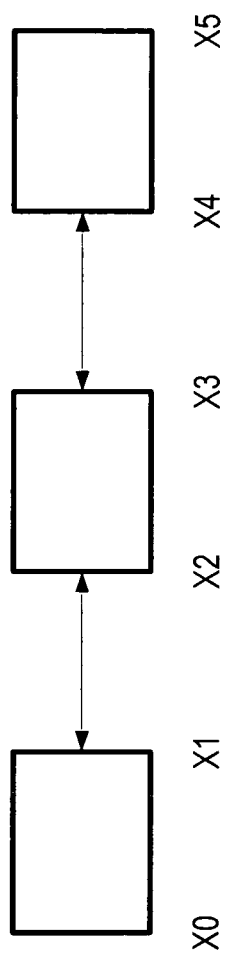
FIG. 17 is a logical diagram illustrating 3 buttons and their respective edge positions.
Figure 18:
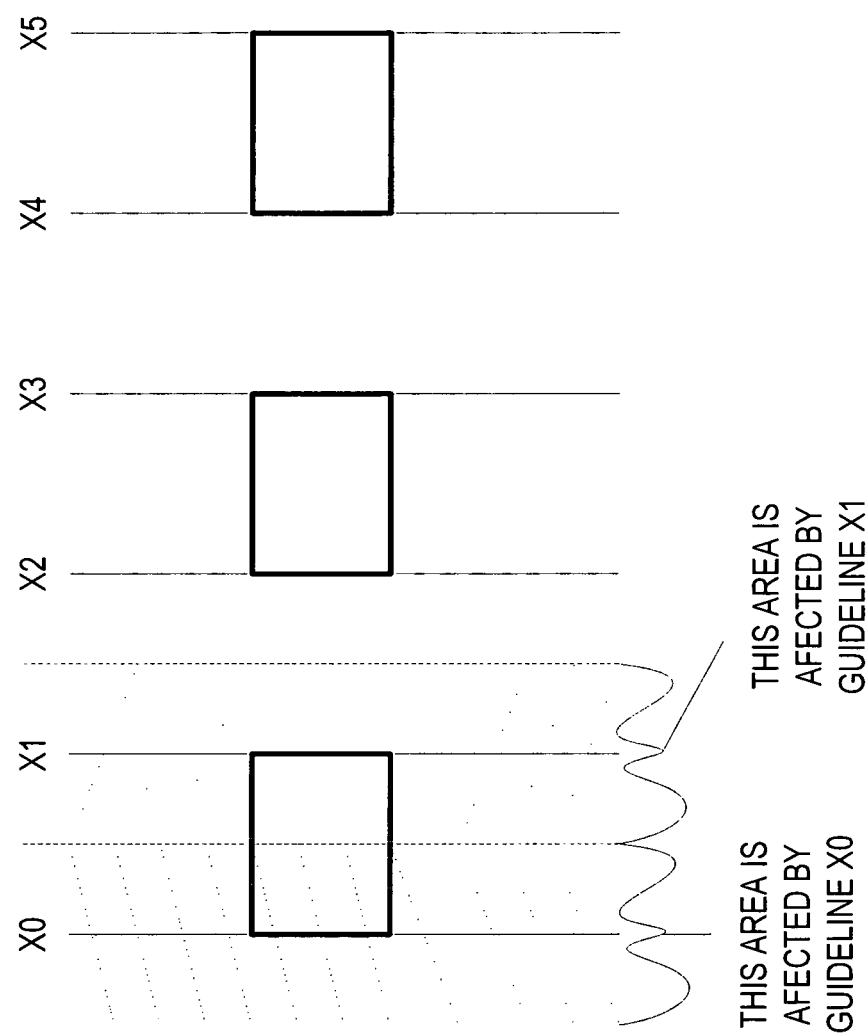
FIG. 18 is a logical diagram that illustrates six guidelines that could be used for preserving the size of the gaps between each of the 3 buttons to ensure they remain the same after pixel snapping is applied.

FIG. 17 is a logical diagram illustrating 3 buttons (or other types of visual elements) and their respective edge positions. In one implementation, by using one or more of the relative guidelines techniques as described herein, the gap between X1 and X2, and the gap between X3 and X4 can be preserved as the same gap size. This example will be described in further detail in FIGS. 18-21. FIG. 18 is a logical diagram that illustrates six guidelines (labeled X0-X5) that could be used for preserving the size of the gaps between each of the 3 buttons to ensure they remain the same after pixel snapping is applied. The first area is affected by guideline X0. The second area is affected by guideline X1, and so on. FIG. 19, for example, shows a relative guideline set that the user would specify in order to preserve the gaps between the 3 buttons. These relative guidelines could be used with the pixel snapping procedures with relative guidelines discussed in FIGS. 12-16. For example, as shown in FIG. 20, these relative guidelines shown in FIG. 19 translate (e.g. by the user) into x and d coordinates, where x represents the leading coordinate and d represents the offset from the leading coordinate.

Upon applying the guideline snapping procedure described in FIG. 14 for each of these relative guidelines (X0 to X5), the system would generate the results shown in FIG. 21. In other words, after executing the guideline snapping procedure 6 times for each of the relative guidelines (in any particular order), a resulting set of snapped guideline coordinates is generated. For example, the system converts the leading coordinate value to a revised leading coordinate value that represents the leading coordinate value in a device space (stage 432 on FIG. 14). This revised leading coordinate value is represented by X0 to X5 on FIG. 21. As one example, the 0.00 value for x0 was converted to 0.000 in device space (X1).

The system then converts the offset value to a revised offset value that represents the revised offset value in the device space (stage 434 on FIG. 14). This revised offset value is represented by D0 to D5. As one example, the 0.00 value for d0 was converted to 0.000 in device space (D0). The revised leading coordinate value (X0 to X5) is rounded to a nearest whole number (stage 436 on FIG. 14), as indicated by X0' to X5'. The 0.000 for X0, for example, is rounded to 0. The revised offset value is rounded to the nearest whole number (stage 468 on FIG. 14), as indicated by D0' to D5'. For example, 0.000 for D0 is rounded to 0. The snapped guideline coordinate is then calculated as the sum of the rounded revised leading coordinate value and the rounded revised offset value (stage 440 on FIG. 14). The snapped guideline coordinate is represented as X0" to X5". These snapped guideline coordinates are then used by the pixel snapping procedure as described herein to achieve an improved output rendering in an anti-aliased scenario, while maintaining the size of the gap between the edges of the visual elements for which the relative guidelines where specified. You can see that the gap size can be preserved between the buttons by looking at the values for X2" and X1" (38−37=1), and the values for X4" and X3" (76−75=1), both of which have a gap between them of one (1).

Figure 22:
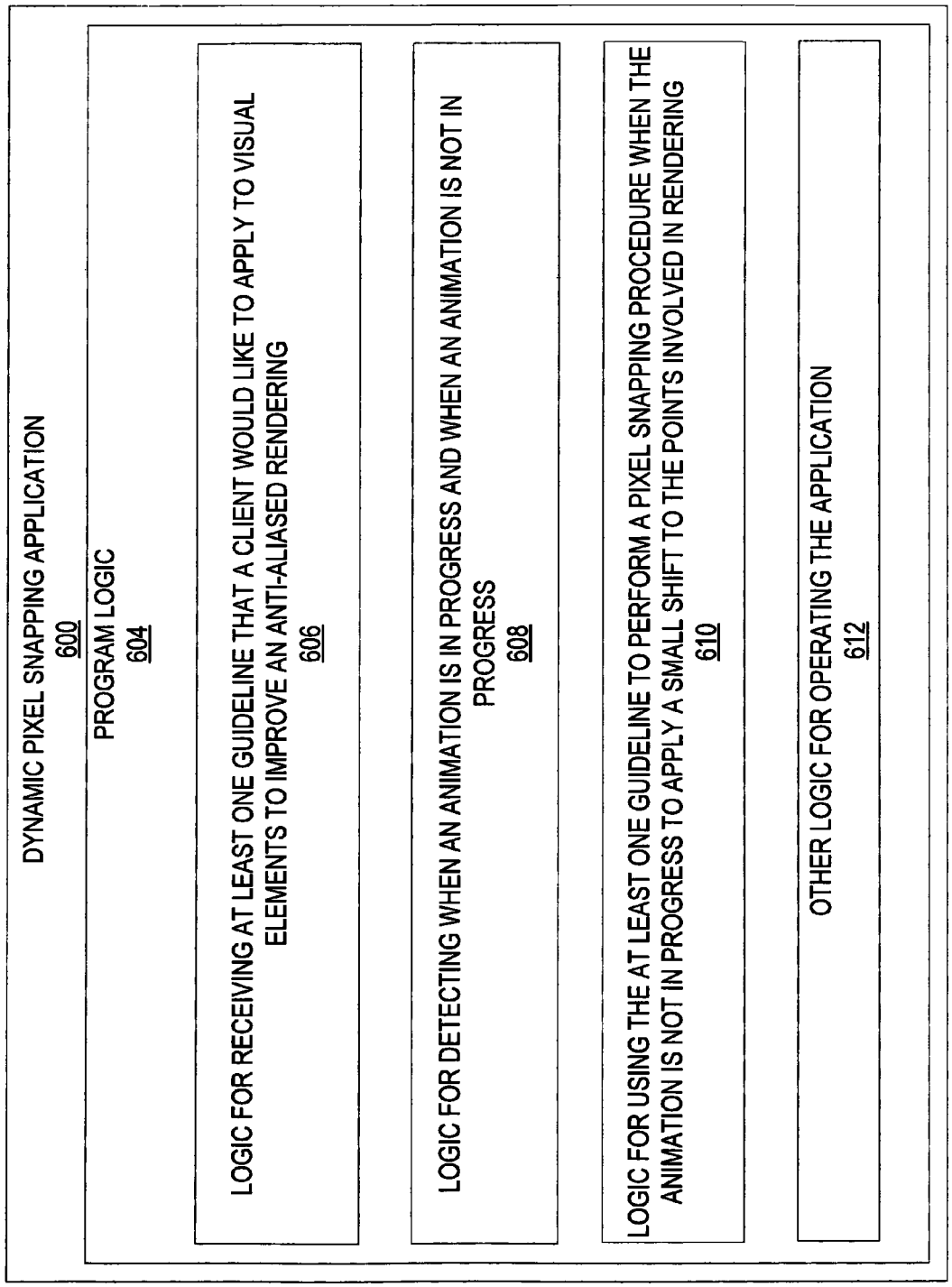
FIG. 22 is a diagrammatic view of a dynamic pixel snapping application of one implementation operating on the computer system of FIG. 1.

Turning now to FIGS. 22-25, a dynamic pixel snapping application is described. FIG. 22 illustrates one implementation of a dynamic pixel snapping application 600. In one implementation, program logic 604 for dynamic pixel snapping application 600 is included as part of program logic 204 for anti-aliased pixel snapping application 200. Program logic 604 includes logic for receiving at least one guideline that a client would like to apply to visual elements to improve an anti-aliased rendering 606; logic for detecting when an animation is in progress and when an animation is not in process 608; logic for using the at least one guideline to perform a pixel snapping procedure when the animation is not in progress to apply a small shift to the points involved in rendering 610; and other logic for operating the application 612.

Figure 23:
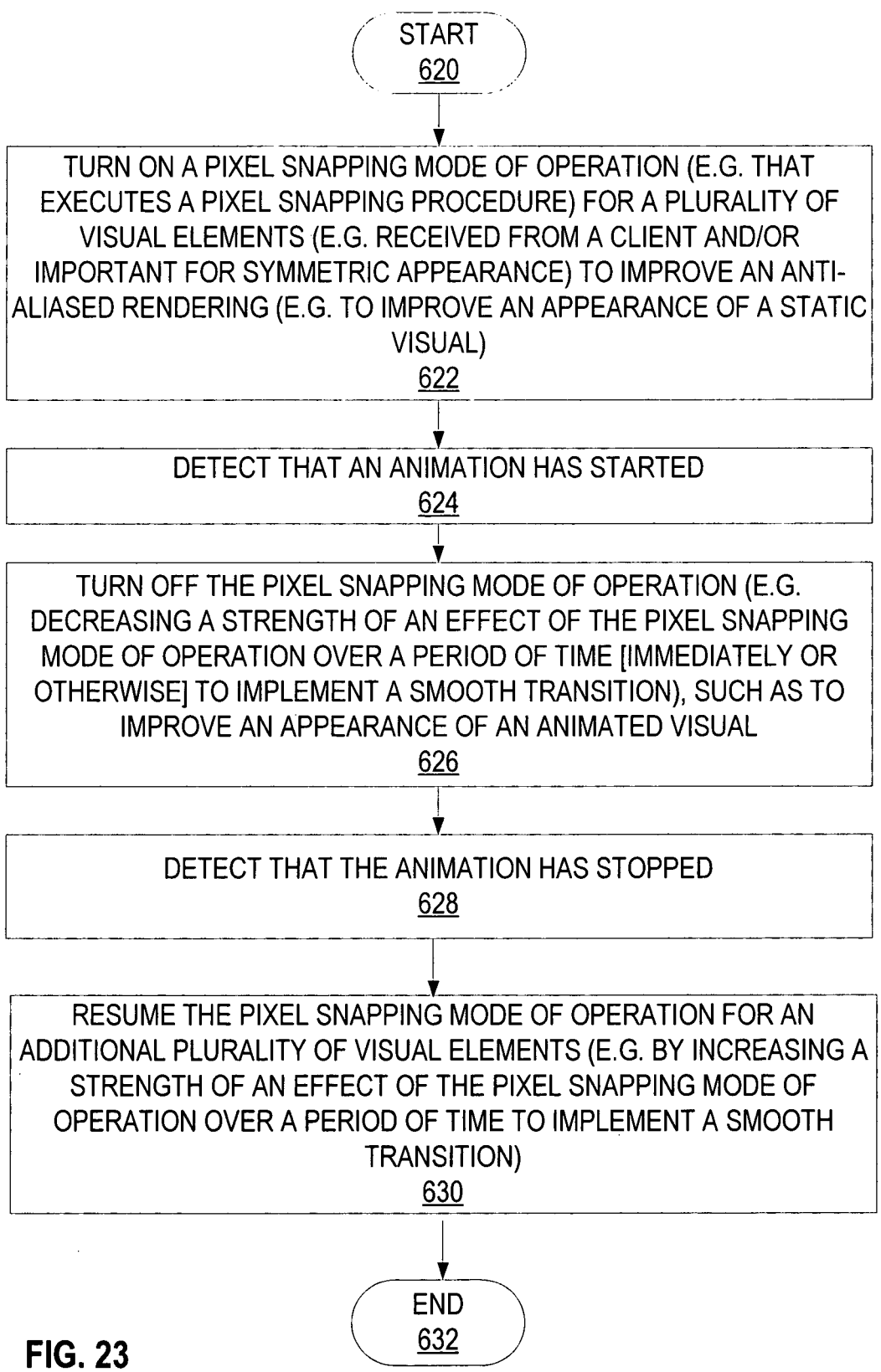
FIG. 23 is a process flow diagram for one implementation of the system of FIG. 22 illustrating the stages involved in dynamically turning a pixel snapping mode of operation on and off.

FIG. 23 illustrates one implementation of the stages involved in dynamically turning a pixel snapping mode of operation on and off. In one form, the process of FIG. 23 is at least partially implemented in the operating logic of computing device 100. The procedure begins at start point 620 with turning on a pixel snapping mode of operation (e.g. that executes a pixel snapping procedure) for a plurality of visual elements (e.g. received from a client and/or important for symmetric appearance) to improve an anti-aliased rendering (e.g. to improve an appearance of a static visual) (stage 622). The system detects that an animation has started (stage 624) and turns off the pixel snapping mode of operation, such as immediately (stage 626). In one implementation, a strength of the effect of the pixel snapping mode of operation is decreased over a period of time to implement a smooth transition, such as to improve an appearance of an animated visual (stage 626). The system detects that the animation has stopped (stage 628) and resumes the pixel snapping mode of operation for an additional plurality of visual elements (stage 630). In one implementation, a strength of an effect of the pixel snapping mode of operation is increased over a period of time to implement a smooth transition (stage 630). The process ends at end point 632.

Figure 24:
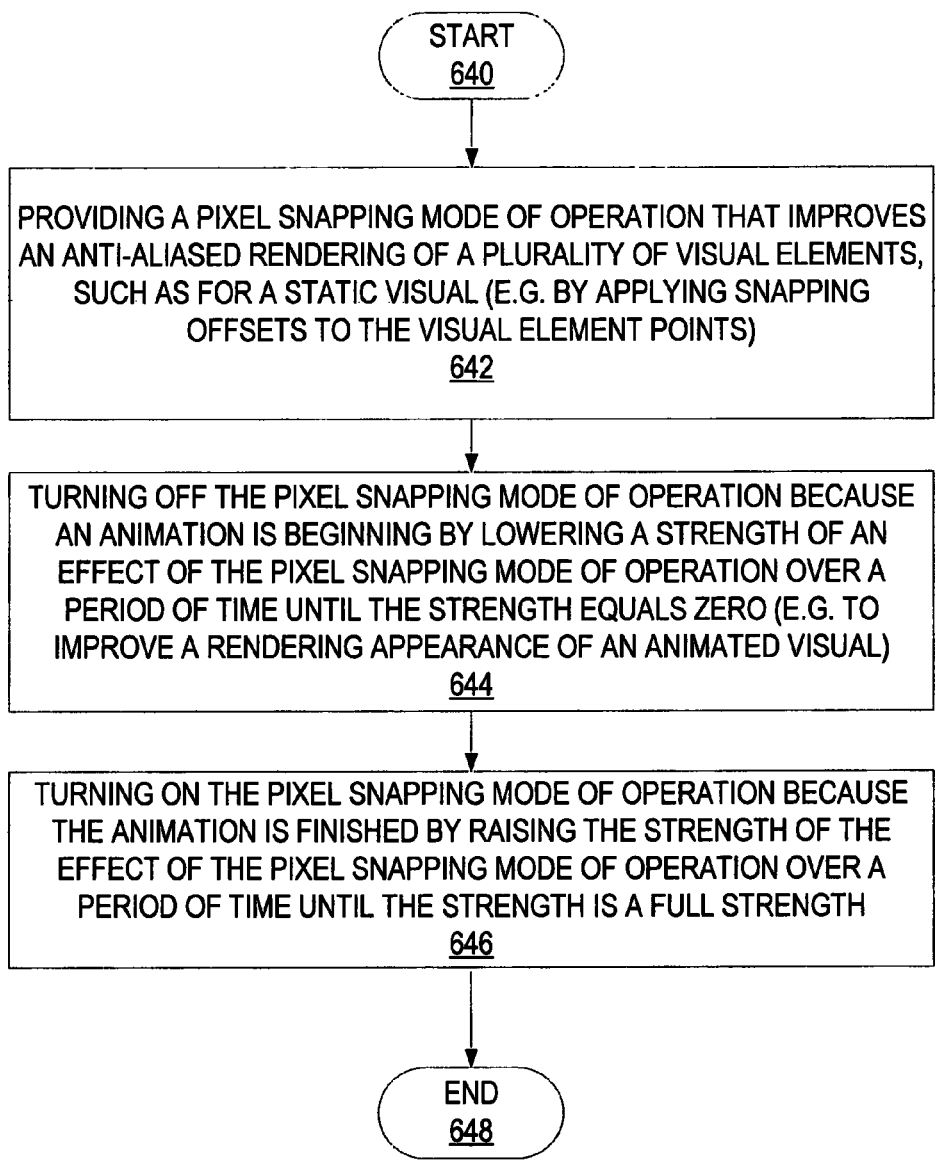
FIG. 24 is a process flow diagram for one implementation of the system of FIG. 22 illustrating the stages involved in turning the pixel snapping mode of operation on and off.

FIG. 24 illustrates one implementation of the stages involved in implementing a smooth transition when turning the pixel snapping mode of operation on and off. In one form, the process of FIG. 24 is at least partially implemented in the operating logic of computing device 100. The procedure begins at start point 640 with providing a pixel snapping mode of operation that improves an anti-aliased rendering of a plurality of visual elements, such as for a static visual (e.g. by applying snapping offsets to the visual element points) (stage 642). The pixel snapping mode of operation is turned off because an animation is beginning by lowering a strength of an effect of the pixel snapping mode of operation over a period of time until the strength equals zero (e.g. to improve a rendering appearance of an animated visual) (stage 644). The pixel snapping mode of operation is turned on because the animation is finished by raising the strength of the effect of the pixel snapping mode of operation over a period of time until the strength is a full strength (stage 646). The process ends at end point 648.

In yet other implementations, one or more combinations of these techniques are used to improve output rendering in certain anti-aliased rendering or other scenarios. As one non-limiting example, combinations of the relative guidelines techniques can be used with combinations of the dynamic pixel snapping techniques to improve an overall output rendering.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. All equivalents, changes, and modifications that come within the spirit of the implementations as described herein and/or by the following claims are desired to be protected.

For example, a person of ordinary skill in the computer software art will recognize that the client and/or server arrangements, user interface screen content, and/or data layouts as described in the examples discussed herein could be organized differently on one or more computers to include fewer or additional options or features than as portrayed in the examples.

What is claimed is:

1. A method for snapping visual element points to a pixel grid to improve an anti-aliased rendering comprising the steps of:
   receiving information regarding at least one area of a visual element which is important for symmetric appearance, the information comprising at least two guideline pairs that represent elements for which gaps should be preserved, the gaps being located between guidelines of the at least two guideline pairs;
   performing a guideline snapping procedure for each relative guideline in the guideline pairs to generate a displacement for each relative guideline;
   providing the displacement for each relative guideline as input to a pixel snapping procedure that shifts the points of the visual element to create an adjusted image; and
   rendering the adjusted image on a display device in an anti-aliased rendering scenario.

2. The method of claim 1, wherein each relative guideline includes two numbers that are a leading coordinate value representing a vertical or horizontal position, and an offset value representing a distance from the leading coordinate.

3. The method of claim 2, where the guideline snapping procedure comprises:
   converting the leading coordinate value to a revised leading coordinate value that represents the leading coordinate value in a device space;
   converting the offset value to a revised offset value that represents the revised offset value in the device space;
   calculating a given guideline coordinate as the sum of the revised leading coordinate value and the revised offset value;
   rounding the revised leading coordinate value to a nearest whole number;
   rounding the revised offset value to the nearest whole number;
   calculating a snapped guideline coordinate as the sum of the rounded revised leading coordinate value and the rounded revised offset value; and
   calculating a displacement as the difference between the snapped guideline coordinate and the given guideline coordinate.

4. The method of claim 3, wherein two guidelines can be implicitly paired by supplying equal leading coordinate values.

5. The method of claim 3, wherein a distance between snapped positions of each relative guideline in a guideline pair does not depend on the leading coordinate.

6. The method of claim 3, wherein the guideline snapping procedure ensures that when a plurality of offset values are a same value in two guideline pairs, a size of two gaps between the visual elements represented by the two guideline pairs will be the same size.

7. The method of claim 3, wherein the converting the leading coordinate value step comprises converting the leading coordinate value to a real number that represents the leading coordinate value in the device space.

8. The method of claim 3, wherein the converting the offset value step comprises converting the offset value to a real number that represents the offset value in the device space.

9. The method of claim 1, wherein the information further comprises one or more additional relative guidelines that a client would like to be snapped towards a pixel grid line.

10. The method of claim 9, wherein the one or more additional guidelines comprise at least one vertical guideline or at least one horizontal guideline, each vertical guideline being represented by a leading x-coordinate and a horizontal offset, and each horizontal guideline being represented by a leading y-coordinate and a vertical offset.

11. The method of claim 1, wherein the information is received from a client.

12. The method of claim 1, wherein the pixel snapping procedure comprises:
for each vertical relative guideline of the relative guidelines, calculating a horizontal displacement between an original position of the respective vertical guideline in device space and a horizontally snapped whole pixel position of the respective vertical guideline; and
for each horizontal offset, applying the respective horizontal displacement to a plurality of points that define line positioning.

13. The method of claim 12, further comprising:
for each horizontal relative guideline of the relative guidelines, calculating a vertical displacement between an original position of the respective horizontal guideline in device space and a vertically snapped whole pixel position of the respective horizontal guideline; and
for each vertical offset, applying the respective vertical displacement to a plurality of points that define line positioning.

14. The method of claim 12, wherein the information further comprises one or more additional guideline pairs that a client would like to be snapped towards pixel grid lines, and wherein the pixel snapping procedure further comprises:
creating a new snapped guideline pair for each of the one or more pairs of edges that need a gap between edges to be preserved, and then using the new guideline pair in the calculating step.

15. The method of claim 1, wherein the adjusted image has an improved appearance.

16. The method of claim 1, wherein the pixel snapping procedure comprises snapping the visual element edge falling between two device pixels directly onto one device pixel on the pixel grid.

17. A computer storage device having computer-executable instructions for causing a computer to perform the steps recited in claim 1.

18. A computer storage device having computer-executable instructions for causing a computer to perform steps comprising:
receive a guideline pair that represents a gap between a plurality of elements which the client would like to be preserved when snapping edges of the elements towards a pixel grid line, the gap being located between guidelines of the guideline pair;
calculate a displacement for each relative guideline within the guideline pair; and
provide the displacement for each relative guideline as inputs to a pixel snapping procedure, the pixel snapping procedure being operable to apply a small shift to a point involved in rendering.

19. The computer storage device of claim 18, wherein the pixel snapping procedure is operable to snap the visual element edge falling between two device pixels directly onto one device pixel on the pixel grid.

20. A method for snapping points of interest to a grid in anti-aliased rendering scenarios comprising the steps of:
providing a first API for setting a collection of horizontal pixel snapping guidelines on at least a first visual, an additional horizontal parameter specifying that the horizontal collection contains two numbers for each horizontal guideline that might be paired with another horizontal guideline in the collection that corresponds to a second visual, a first horizontal guideline on the first visual and a second horizontal guideline on the second visual being separated by a gap to be preserved between the first and second visuals;
providing a second API for setting a collection of vertical pixel snapping guidelines on at least the first visual, an additional vertical parameter specifying that the vertical collection contains two numbers for each vertical guideline that might be paired with another vertical guideline in the collection that corresponds to another visual;
accessing the horizontal collection and the vertical collection; and
using the horizontal pixel snapping guidelines and the vertical pixel snapping guidelines to snap a plurality of points of interest to a pixel grid before anti-aliased rendering.

* * * * *